(12) United States Patent
Dow et al.

(10) Patent No.: US 8,635,396 B2
(45) Date of Patent: *Jan. 21, 2014

(54) METHOD FOR SYMMETRIC LIVE MIGRATION OF VIRTUAL MACHINES

(71) Applicant: International Business Machines Corporation, Armonk, NY (US)

(72) Inventors: Eli M. Dow, Poughkeepsie, NY (US); Marie R. Laser, Poughkeepsie, NY (US); Sarah J. Sheppard, Poughkeepsie, NY (US); Jessie Yu, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/666,495

(22) Filed: Nov. 1, 2012

(65) Prior Publication Data

US 2013/0060988 A1 Mar. 7, 2013

Related U.S. Application Data

(63) Continuation of application No. 12/619,137, filed on Nov. 16, 2009, now Pat. No. 8,370,560.

(51) Int. Cl.
*G06F 12/00* (2006.01)
(52) U.S. Cl.
USPC ............. 711/6; 711/E12.001; 718/1; 718/104
(58) Field of Classification Search
None
See application file for complete search history.

(56) References Cited

U.S. PATENT DOCUMENTS

| | | | |
|---|---|---|---|
| 7,313,793 B2 | 12/2007 | Traut et al. | |
| 7,484,208 B1 | 1/2009 | Nelson | |
| 7,962,703 B1 | 6/2011 | Shah et al. | 711/154 |

(Continued)

FOREIGN PATENT DOCUMENTS

EP 2065805 A1 6/2009

OTHER PUBLICATIONS

Clark, et al., "Live Migration of Virtual Machines," USENIX Association, Berkley, California, 2005.

(Continued)

*Primary Examiner* — Mardochee Chery
(74) *Attorney, Agent, or Firm* — Fleit Gibbons Gutman Bongini & Bianco PL; Thomas Grzesik

(57) ABSTRACT

A method is provided for symmetric live migration of virtual machines. According to the method, a first least recently used map is generated for a set of memory pages of a first virtual machine. The first least recently used map includes metadata including memory page physical address location information. A first memory page of the first virtual machine and the metadata for the first memory page is sent from the first virtual machine to a second virtual machine while the first virtual machine is executing. A first memory page and meta data associated therewith of the second virtual machine is received from the second virtual machine. The memory pages of the first virtual machine are ordered from a first location of the first least recently used map to a last location of the first least recently used map based on how recently each of the memory pages of the first virtual machine has been used.

9 Claims, 10 Drawing Sheets

(56) References Cited

U.S. PATENT DOCUMENTS

| | | | |
|---|---|---|---|
| 2006/0277432 A1 | 12/2006 | Patel et al. | 714/6 |
| 2008/0189700 A1 | 8/2008 | Schmidt et al. | 718/1 |
| 2008/0222633 A1 | 9/2008 | Kami | |
| 2009/0007099 A1 | 1/2009 | Cummings et al. | |
| 2009/0037680 A1 | 2/2009 | Colbert et al. | |
| 2009/0204718 A1 | 8/2009 | Lawton et al. | |
| 2010/0094948 A1 | 4/2010 | Ganesh et al. | 709/212 |
| 2011/0099319 A1 | 4/2011 | Mukherjee et al. | 711/6 |

OTHER PUBLICATIONS

Gupta, D., et al., "Difference Engine: Harnessing Memory Redundancy in Virtual Machines," USENIX Association, Berkeley, California, 2008.

International Search Report and Written Opinion dated Jun. 8, 2011 for PCT/EP2010/065433.

Stultz, J.A., "Optimizing Live Virtual Machine Migrations Using Content-Based Page Hashes," Thesis submitted to the Department of Electrical Engineering and Computer Science in Partial Fulfillment of Master Engineering in Electrical Engineering and Computer Science, Aug. 1, 2008, pp. 1-55, XP002624588.

METHOD FOR SYMMETRIC LIVE MIGRATION OF VIRTUAL MACHINES

CROSS-REFERENCE TO RELATED APPLICATIONS

This application is a continuation of prior U.S. application Ser. No. 12/619,137, filed Nov. 16, 2009, now U.S. Pat. No. 8,370,560. The entire disclosure of U.S. application Ser. No. 12/619,137 is herein incorporated by reference.

FIELD OF THE INVENTION

The present invention generally relates to the field of virtual machines, and more particularly relates to the migration of virtual machines.

BACKGROUND OF THE INVENTION

System migrations of virtual machines are performed for a variety of reasons, including to provide a backup system while hardware and/or software upgrades are being installed. The virtual machine (including memory, system, applications, etc.) that is being copied is referred to as the source virtual machine and the virtual machine that is built as a result of the migration is referred to as the target virtual machine.

One type of migration is live migration, which migrates a virtual machine while it is running. Live virtual machine guest migration is often desired by companies with mission critical systems. Conventional migration systems generally perform live migration (or "swapping") between two guests as follows. Guest A is migrated onto guest B's physical machine, and then guest B is migrated onto guest A's physical machine. However, this conventional migration process requires at least one of the physical machines to have enough hardware resources to support the additional virtual guest. In other words, if at least one physical machine does not have enough hardware resources to support the additional virtual guest, the migration process cannot be performed. Also, with conventional live migration processes only one virtual machine can be migrated at any given time.

SUMMARY OF THE INVENTION

One embodiment of the present invention provides a computer-implemented method for symmetric live migration of virtual machines. The computer implemented method comprises generating a first least recently used map for a set of memory pages of a first virtual machine. The first least recently used map includes metadata for each of the memory pages of the first virtual machine. The metadata comprises a physical address location for each of the memory pages of the first virtual machine. A first of the memory pages of the first virtual machine and the metadata for the first memory page of the first virtual machine is sent from the first virtual machine to a second virtual machine while the first virtual machine is executing. A first memory page of the second virtual machine and metadata for the first memory page of the second virtual machine is received from the second virtual machine at the first virtual machine. The memory pages of the first virtual machine are ordered from a first location of the first least recently used map to a last location of the first least recently used map based on how recently each of the memory pages of the first virtual machine has been used. The memory page that has been least recently used is indicated by the first location of the first least recently used map. The memory page that has been most recently used is indicated by the last location of the first least recently used map. The first memory page of the first virtual machine is located at the first location of the first least recently used map. The first memory page of the second virtual machine is located at a corresponding first location of a second least recently used map for the memory pages of the second virtual machine.

DETAILED DESCRIPTION

Various embodiments of the present invention will be discussed in detail hereinbelow with reference to the attached drawings.

When a guest computer system is emulated on a host computer system, the guest computer system is said to be a "virtual machine" because the guest computer system exists in the host computer system as a pure software representation of the operation of one or more specific hardware architectures. The terms emulator, virtual machine, and processor emulation are sometimes used interchangeably to denote the ability to mimic or emulate the hardware architecture of an entire computer system. The operation of these components is emulated in the virtual machine that is being run on the host machine. An emulator program executing on the operating system software and hardware architecture of the host computer mimics the operation of the entire guest computer system.

The emulator program acts as the interchange between the hardware architecture of the host machine and the instructions transmitted by the software running within the emulated environment. This emulator program may be a host operating system (HOS), which is an operating system running directly on the physical computer hardware. Alternately, the emulated environment can also be a virtual machine monitor (VMM) which is a software layer that runs directly above the hardware and which virtualizes all the resources of the machine by exposing interfaces that are the same as the hardware the VMM is virtualizing (which enables the VMM to go unnoticed by operating system layers running above it). A host operating system and a VMM may run side-by-side on the same physical hardware.

One of the many advantages of a virtual machine (VM) over a physical machine is the ability to quickly and cheaply create multiple instances of the same virtual machine. If allowed by the virtual machine implementation, multiple virtual machines can exist simultaneously in a single host machine (host computer system) environment, and the resources of the host machine can be divided among the various virtual machines. This flexible resource allocation becomes even more useful when combined with the ability to move, or "migrate," virtual machines from one host machine to another. Being able to migrate a virtual machine quickly and easily from one host machine to another is useful, for example, for "load balancing" systems, performing hardware or software upgrades, or handling disaster recovery.

Figure 1:
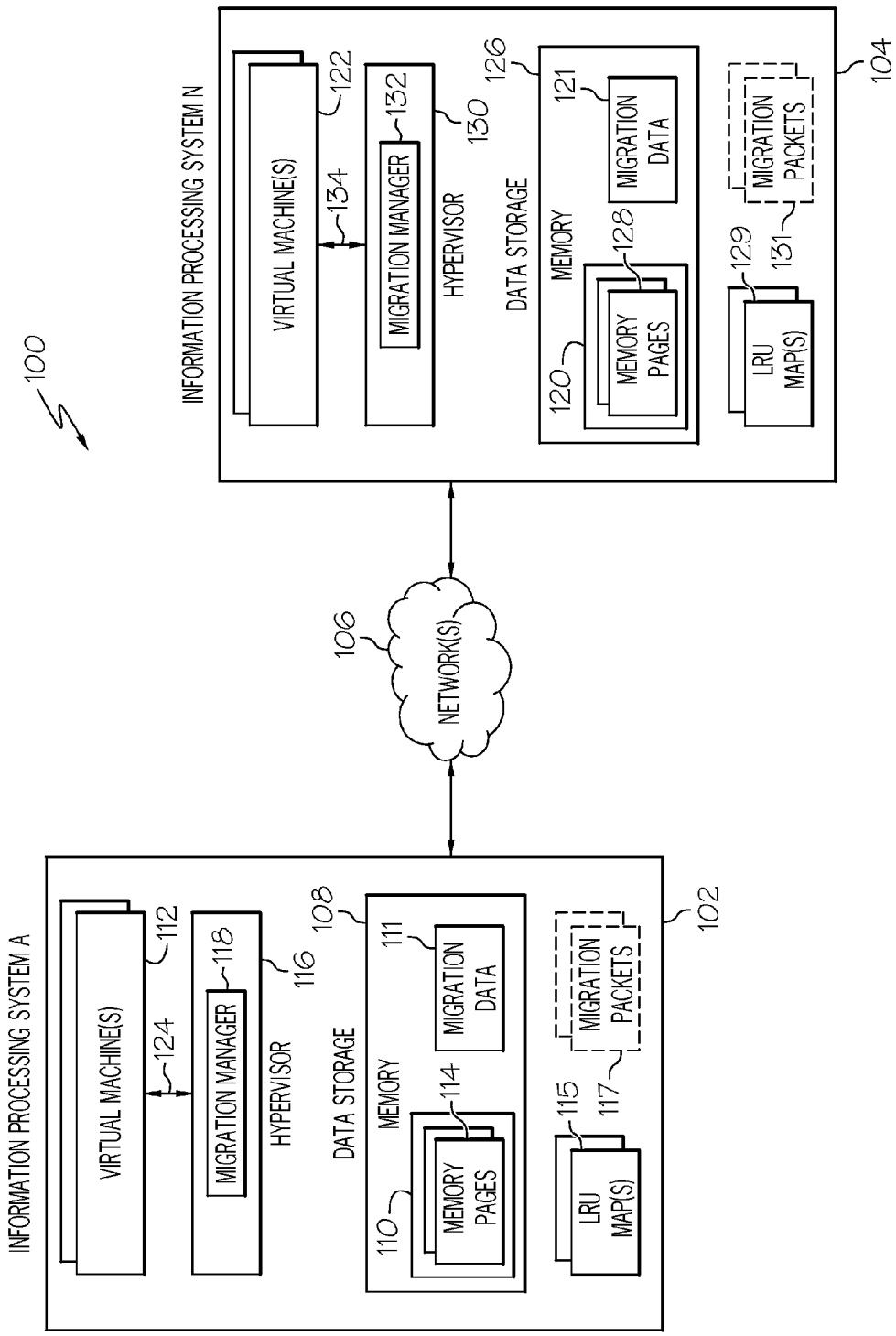
FIG. 1 is a block diagram illustrating an operating environment according to one embodiment of the present invention.

FIG. 1 shows an operating environment according to one embodiment of the present invention. As shown, the operating environment 100 includes multiple information processing systems that are communicatively coupled to one or more networks 106 (only two systems are shown for simplicity). A first of the information processing systems 102 is a source host system that is communicatively coupled with a second of the information processing systems 104 that is a target host system, via the network 106. The network 106 can be any type of wired and/or wireless communications network. For example, the network 106 may be an intranet, extranet, or an internetwork, such as the Internet, or a combination thereof. The network 106 can include wireless, wired, and/or fiber optic links.

The source host system 102 is referred to as a "source host" because it hosts one or more virtual machines 112, and the target host system 104 is referred as a "target host" because this is the system where the virtual machine 112 on the source host 102 is to be migrated. The target host system 104 can also be referred to as a source host system for its own virtual machine 122, and the source host system 102 can also be referred to as the target host system for this virtual machine 122 because the virtual machine 122 is to be migrated on the source host system 104 in this embodiment. Therefore, any of the information processing systems can be a source host system with respect to another and a target host system with respect to another. In the following description, the terms "first information processing system" and "second information processing system" are used to refer to both a source host system with respect to itself and a target host system with respect to another.

The source host system 102 may function as any type of information processing system. In this embodiment, the source host system 102 is a high-speed processing device comprising at least one processing circuit (e.g., a CPU) capable of reading and executing instructions, and handling numerous interaction requests from applications and/or processes within the system 102 and/or from user systems as a shared physical resource. In this embodiment in which users interact with the source host system 102, the users can initiate various tasks on the source host system 102 via the user systems, such as developing and executing system tests, running application programs, and initiating a system migration. While only a single source host system 102 is shown in FIG. 1, multiple host systems can be easily implemented, in communication with one another via direct coupling or via one or more networks. For example, multiple host systems may be interconnected through a distributed network architecture. The single source host system 102 may also represent a cluster of hosts collectively performing processes.

In this embodiment, the source host system 102 accesses and stores data in a source data storage device 108. The source data storage device 108 refers to any type of storage and may include a secondary storage element (e.g., hard disk drive, tape, or a storage subsystem) that is internal or external to the source host system 102. Types of data that may be stored in the source data storage device 108 include source memory 110 included in one or more source virtual machines 112 (e.g., virtual guests), and migration data 111 (e.g., data structures). In this embodiment, contents of the source memory 110 include memory pages 114.

The system 102 of this embodiment also includes a least recently used (LRU) map 115 that a migration manager 118 uses during migration of the memory pages 114. Migration packets 117 are optionally used to store physical address location information for each of the memory pages 114 in this embodiment. The migration packets 117 are sent to a target system 104 along with a corresponding memory page 114 during migration. In this embodiment, source virtual machine configuration information and/or source memory access data is also stored in the data storage device 108. The source data storage device 108 shown in FIG. 1 is an exemplary device illustrated for purposes of simplification and ease of explanation. In this or further embodiments, there may be multiple source data storage devices 108 utilized by the source host system 102.

In this embodiment, the source host system 102 executes various applications, including a source hypervisor 116 and one or more virtual machines 112. The term "hypervisor" refers to a low-level application that supports the execution of one or more virtual machines. The source hypervisor 116 manages access to resources of the source host system 102 and serves as a virtual machine monitor to support concurrent execution of the virtual machines. Each virtual machine can support specific guest operating systems and multiple user sessions for executing software written to target the guest operating systems. For example, one virtual machine may support an instance of the Linux® operating system, while a second virtual machine executes an instance of the z/OS® operating system. Other guest operating systems can also be supported by the source hypervisor 116 through the virtual machines.

In this embodiment, the source hypervisor 116 includes a migration manager 118 that performs various migration operations to migrate source memory 128 from the source virtual machine 112 to target memory 120 on a target virtual machine 122 (e.g., a virtual guest). In this exemplary embodiment, the source hypervisor 116 manages execution control of virtual machines on the source host system 102 through a virtual machine control bus 124. Each virtual machine control bus 124 can handle an exchange of low-level control information, such as interrupts, device driver commands, device driver data, and the like.

FIG. 1 also shows another information processing system 104 that is a target host system for another system, such as the source host system 102. The target host system 104 is communicatively coupled with the source host system 102 via the network 106. The target host system 104 may function as any type of information processing system. In this embodiment, the target host system 104 is a high-speed processing device comprising at least one processing circuit (e.g., a CPU) capable of reading and executing instructions, and handling numerous interaction requests from applications and/or processes within the system 104 and/or from user systems as a shared physical resource.

In this embodiment in which users interact with the target host system 104, the users can initiate various tasks on the target host system 104 via the user systems, such as developing and executing system tests, running application programs, and initiating a system migration. While only a single target host system 104 is shown in FIG. 1, multiple host systems can be easily implemented, in communication with one another via direct coupling or via one or more networks. For example, multiple host systems may be interconnected through a distributed network architecture. The single target host system 104 may also represent a cluster of hosts collectively performing processes.

In this embodiment, the target host system 104 accesses and stores data in a source data storage device 126. The target data storage device 126 refers to any type of storage and may include a secondary storage element (e.g., hard disk drive, tape, or a storage subsystem) that is internal or external to the target host system 104. Types of data that may be stored in the target data storage device 126 include target memory 120 included in one or more target virtual machines 122 and migration data 121 (e.g., data structures). In this embodiment, contents of the target memory 120 include memory pages 128.

The system 104 of this embodiment also includes a least recently used (LRU) map 129 that a migration manager 132 uses during migration of the memory pages 128. Migration packets 131 are optionally used to store physical address location information for each of the memory pages 128 in this embodiment. The migration packets 131 are sent to a target system 102 along with a corresponding memory page 128 during migration. In this embodiment, target virtual machine configuration information and/or target memory access data is also stored in the data storage device 126. The target data storage device 126 shown in FIG. 1 is an exemplary device illustrated for purposes of simplification and ease of explanation. In this or further embodiments, there may be multiple target data storage devices 126 utilized by the target host system 104.

In this embodiment, the target host system 104 executes various applications, including a target hypervisor 130 and one or more virtual machines 122. The target hypervisor 130 manages access to resources of the target host system 104 and serves as a virtual machine monitor to support concurrent execution of the virtual machines. Each virtual machine can support specific guest operating systems and multiple user sessions for executing software written to target the guest operating systems. For example, one virtual machine may support an instance of the Linux® operating system, while a second virtual machine executes an instance of the z/OS® operating system. Other guest operating systems can also be supported by the target hypervisor 130 through the virtual machines.

In this embodiment, the target hypervisor 130 includes a migration manager 132 that performs various migration operations to migrate target memory 120 from the target virtual machine 122 to source memory 110 on a source virtual machine 112. The target hypervisor 130 manages execution control of virtual machines 122 on the target host system 104 through a virtual machine control bus 134. Each virtual machine control bus 134 can handle an exchange of low-level control information, such as interrupts, device driver commands, device driver data, and the like.

From a conceptual perspective, the information processing systems generally comprise one or more layers of software running on a foundational layer of hardware. This layering may be performed for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above that layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that those software layers are running on their own private computer system, and thus VMs can allow multiple "guest systems" to run concurrently on a single "host system."

Figure 2:
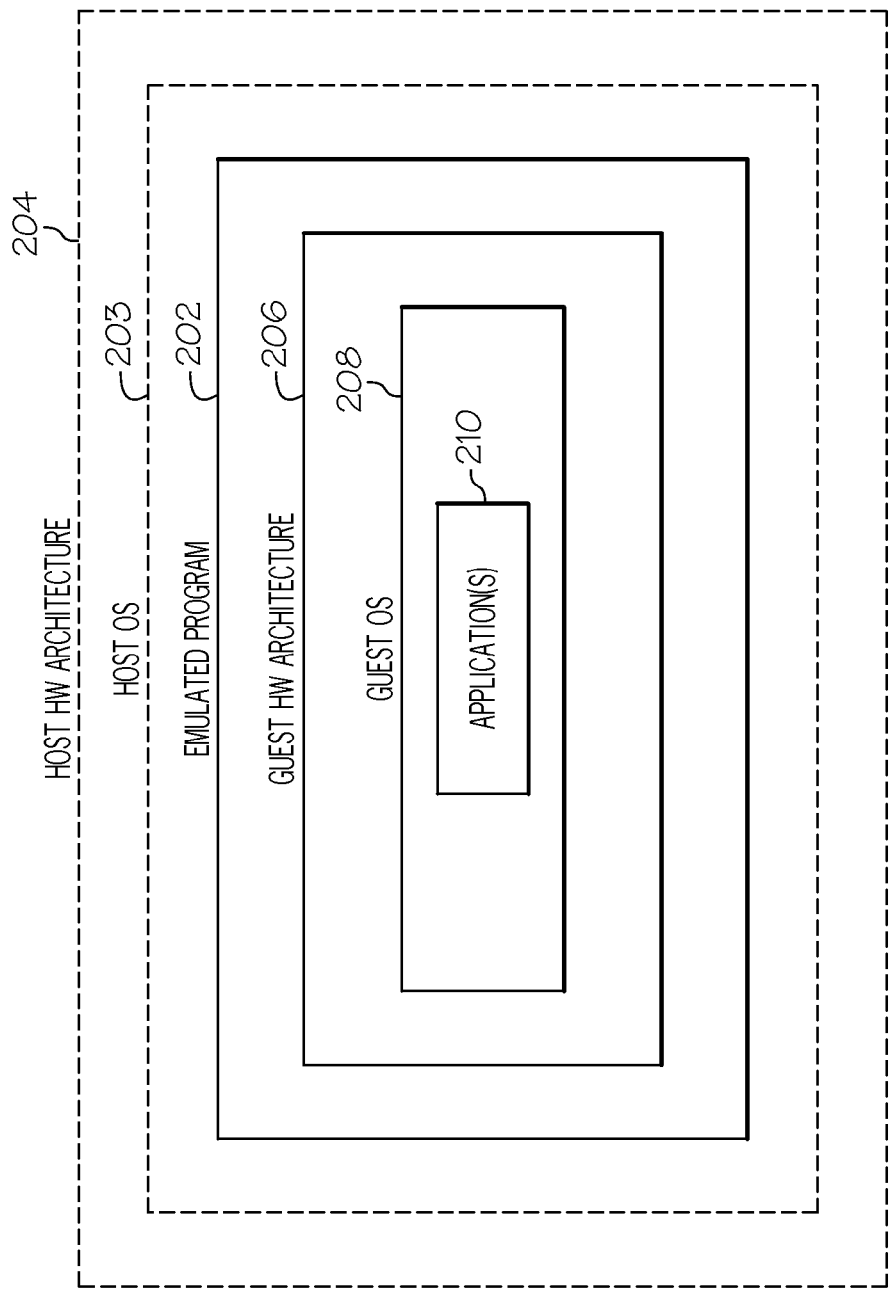
FIG. 2 illustrates the logical layering of hardware and software architecture for an emulated operating environment according to one embodiment of the present invention.

FIG. 2 is a diagram representing the logical layering of hardware and software architecture for an emulated operating environment in an information processing system in accordance with one embodiment of the present invention. An emulation program 202 runs on a host operating system 203 and/or hardware architecture 204. The emulation program 202 emulates a guest hardware architecture 206 and a guest operating system 208. One or more software applications 210, in turn, run on the guest operating system 208. In the emulated operating environment of FIG. 2, because of the operation of the emulation program 202, software application 210 can run on the information processing system comprising the emulated environment even though software application 210 is designed to run on an operating system that is generally incompatible with the host operating system and hardware architecture 204.

Figure 3:
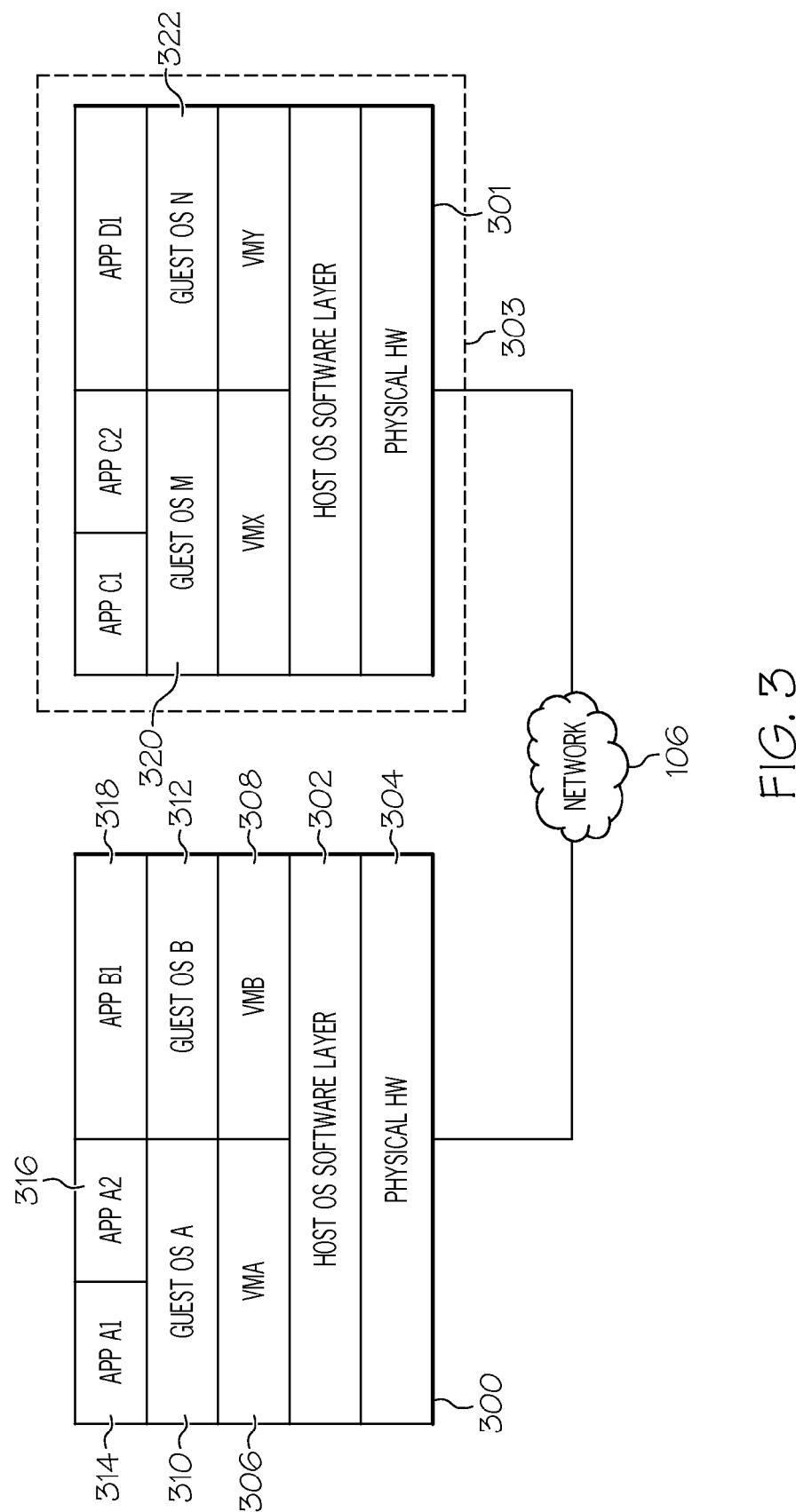
FIG. 3 illustrates a virtualized computing system where two or more virtual machines reside on the same physical hardware according to one embodiment of the present invention.

FIG. 3 illustrates a virtualized computing system 300 in accordance with one embodiment of the present invention. The virtualized computing system of FIG. 3 comprises a host operating system software layer (host OS) 302 running directly above physical computer hardware 304. The host OS 302 virtualizes all of the resources of the machine by exposing interfaces that are the same as the hardware the host OS is virtualizing (which enables the host OS to go unnoticed by operating system layers running above it).

Above the host OS 302 are two virtual machine (VM) implementations: VM A 306, which in this exemplary embodiment is a virtualized Intel 386 processor, and VM B 308, which in this exemplary embodiment is a virtualized version of one of the Motorola 680X0 family of processors. Above each VM 306 and 308 are guest operating system (guest OS) A 310 and guest OS B 312. Above guest OS A 310 are running two applications: application A1 314 and application A2 316. Above guest OS B 312 is application B1 318. VM A 306 and VM B 308 are virtualized computer hardware representations that exist as software constructions and which are made possible due to the presence of specialized software code that not only presents VM A 306 and VM B 308 to Guest OS A 310 and Guest OS B 312 respectively, but which also performs all of the software steps necessary for Guest OS A 310 and Guest OS B 312 to indirectly interact with the real physical computer hardware 304. This complete functionality can be referred to as a virtual machine monitor (VMM) where, in embodiments such as the exemplary one of FIG. 3, the VMM comprises part of the host operating system 302.

In other embodiments, the VMM may be an application running above the host operating system 302 and interacting with the computer hardware only through the host operating system 302. In yet other embodiments, the VMM comprises a partially independent software system that on some levels interacts indirectly with the computer hardware 304 via the host operating system 302 but on other levels interacts directly with the computer hardware 304 (similar to the way the host operating system interacts directly with the computer hardware). And in still further embodiments, the VMM may comprise a fully independent software system that on all levels interacts directly with the computer hardware 304 (similar to the way the host operating system interacts directly with the computer hardware) without utilizing the host operating system 302 (although still interacting with the host operating system 302 insofar as coordinating use of the computer hardware 304 and avoiding conflicts and the like).

All of these variations for implementing the VMM are anticipated to form alternative embodiments for performing the various processes described herein, and the present invention is not limited by these alternative embodiments to any particular VMM configuration. In addition, any reference to interaction between applications 314, 316, and 318 via VM A 306 and/or VM B 308 (presumably in a hardware emulation scenario) should be interpreted to be in fact an interaction between the applications 314, 316, and 318 and a VMM. Likewise, any reference to interaction between applications VM A 306 and/or VM B 308 with the host operating system 302 and/or the computer hardware 304 (presumably to execute computer instructions directly or indirectly on the computer hardware 102) should be interpreted to be in fact an interaction between the VMM and the host operating system 302 or the computer hardware 304 as appropriate.

The virtualized computing system 300 can optionally be communicatively coupled to another virtualized computing system 301 via a network 106, as shown in FIG. 3. The dashed line 303 surrounding the second virtualized computing system 301 indicates that this is another embodiment of the present invention. The second virtualized computing system 301 comprises similar components as the first virtualized computing system 300 discussed above.

In embodiments of the present invention, live virtual machine (live virtual guest) migration is performed between one or more virtual machines 112 on a first information processing system 102 and one or more virtual machines 122 on at least a second information processing system 104. This live migration process is a symmetric live migration process that simultaneously migrates the virtual machine 112 on the first information processing 102 to the second information processing system 104 and migrates the virtual machine 122 on the second information processing system 104 to the first information processing system 102. Also, in the embodiment of FIG. 3 where two virtualized computing systems 300 and 301 are coupled together, symmetric migration of virtual machines can occur across physical hosts and not solely within a host, although this is possible as well. For example, OS A 210 can be swapped with any of OS B 312, OS M 320, or OS N 322. Swapping an OS such as OS B 312 within the same host is useful for, among other things, upgrades and shuffling virtual machines. Migrating across multiple physical hosts is useful for, among other things, machine failure swap scenarios. Also, it should be noted that any of the operating systems 310, 312, 320, and 322 can be another hypervisor with their supported guests.

The symmetric live migration of the present invention is advantageous because it can be performed even when the physical machines of the virtual guests do not have enough resources to support its own guests and the newly migrated guest. This symmetric live migration process can also be used in situations where overcommit is not an option. Memory pages are moved from one system into an intermediate representation on another system and vice versa at substantially the same time. Using this intermediate representation, the original representation of the virtual machine is restored on the new system just prior to activation of the migrated virtual machine on the new system. The combination of using an LRU logical map to control the pages that are swapped (as opposed to the traditionally used physical address ordering), allows for demand paging when an earlier transfer needs to be rolled back. Metadata tagging of memory pages allows "mistakes" in earlier page selection to be undone using a non-obvious swap. A sorting routine can be used to transform the LRU representation back into the physical representation for final guest restart.

In embodiments of the present invention, each migration manager maintains a least recently used (LRU) map of the memory pages utilized by the respective virtual machine. Any mechanism can be used to implement an LRU map, such as maintaining a stack of allocated page numbers. When a page is referenced, the corresponding page number of the page is moved to the top of the stack. When a page is swapped out, the corresponding page number of the page is removed from the stack. Utilizing the LRU map ensures that the memory pages that are least likely to be soon used again are migrated before those that are more likely to be soon used again. This allows for the migration to take place without disrupting the operations of the virtual machines and makes the migration process transparent to the user. In other words, the operations of the virtual machine are not halted during the migration process. Further embodiments of the present invention use another means in place of an LRU map.

In addition to creating the LRU map of the memory pages, the migration manager also monitors the physical address of the memory pages. For example, in one embodiment the migration manager for each memory page maintains the original host system's physical page offset in the memory page itself using one or more available bits within the memory page. Stated differently, the migration manager embeds the physical address of the memory page within itself. In an alternative embodiment, the migration manger maintains the physical address of a memory page at a location that is external to the memory page. For example, the migration manager can maintain this physical address information in a log that is external to the memory page. Then whenever a memory page is swapped from one physical system to another physical system, the migration manager sends a packet including the physical address of the memory page being swapped along with the memory page.

Figure 4:
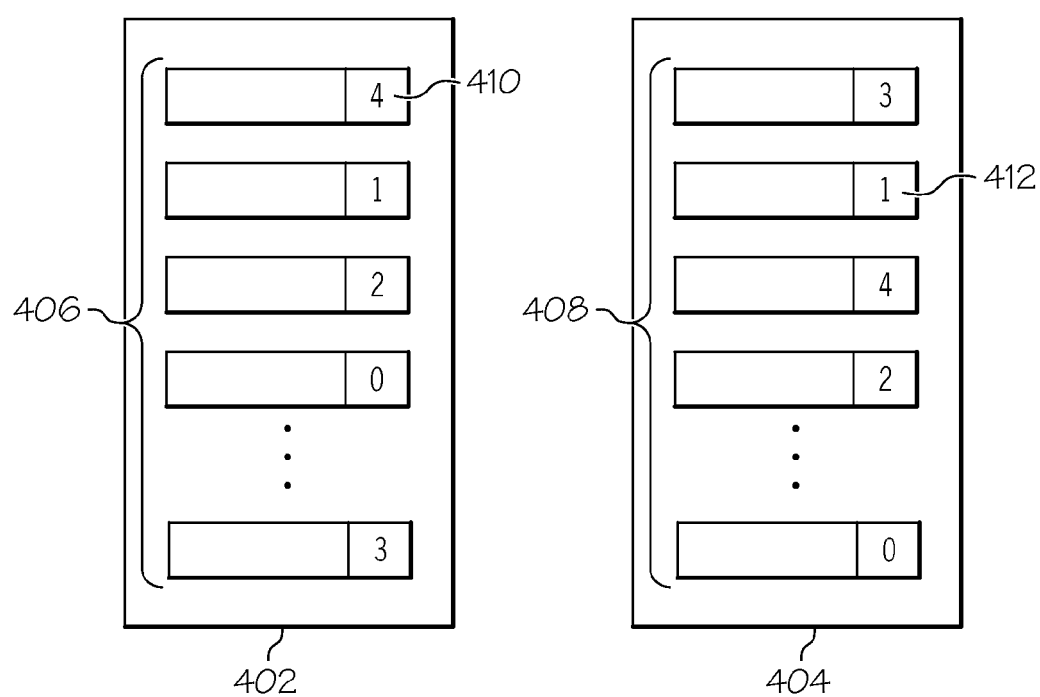
FIG. 4 shows an LRU map for a virtual machine in accordance with one embodiment of the present invention.

FIG. 4 shows an exemplary LRU map for a virtual machine within an information processing system in accordance with one embodiment of the present invention. In particular, FIG. 4 shows an LRU map 402 for memory pages 406 of Virtual Machine A (e.g., Guest A) 112 on the first information processing system 102 and an LRU map 404 for memory pages 408 of Virtual Machine B (e.g., Guest B) 122 on the second information processing system. The memory pages 406 and 408 are ordered with the least recently used at the top of the map and the most recently used at the bottom of the map. In this embodiment, the entry for each memory page 406 and 408 includes metadata 410 and 412 that includes the physical page offset of that memory page within its original host system. As discussed above, this is only an exemplary embodiment, and the physical address information of the memory page can be stored external to the memory page itself in further embodiments. For example, this information could be stored in a hardware register.

In this embodiment, the migration managers 118 and 132 of the first and second systems 102 and 104 are in communication with each other to determine when to perform the symmetric live migration operations. For example, if one system needs to perform load balancing, the migration managers 118 and 132 communicate with each other to initiate the symmetric live migration operations. If both systems 102 and 104 send a page request at the same time, various rules/policies can be implemented to determine which system swaps the first memory page.

When a symmetric live migration operation is to be performed, each migration manager 118 and 132 retrieves the hardware resources required by the virtual machine at the other system. In other words, each migration manager 118 and 132 determines the size of the virtual machine that is to be migrated onto the system of that migration manager. This is done because in the symmetric live migration, the memory pages are swapped symmetrically. Accordingly, if one virtual machine has fewer memory pages than the other, the additional memory pages at the larger virtual machine do not have a corresponding memory page at the smaller virtual machine for swapping. Therefore, in this embodiment, if the virtual machines 112 and 122 are of different sizes, the migration manager managing the smaller virtual machine pads the size of the smaller virtual machine to substantially match the size of the larger virtual machine. For example, the migration manager of the smaller virtual machine can logically add highmem to the smaller virtual machine. Also, each migration manager needs to reserve a page of free memory to perform swapping and sorting of pages. Alternatively, the additional space can be implemented as a hardware feature register. In such an embodiment, the hardware feature register is used for the swapping and sorting of pages and eliminates the need for a free page. The packet comprising the physical location of the pages is still sent to the target host system.

Figure 5:
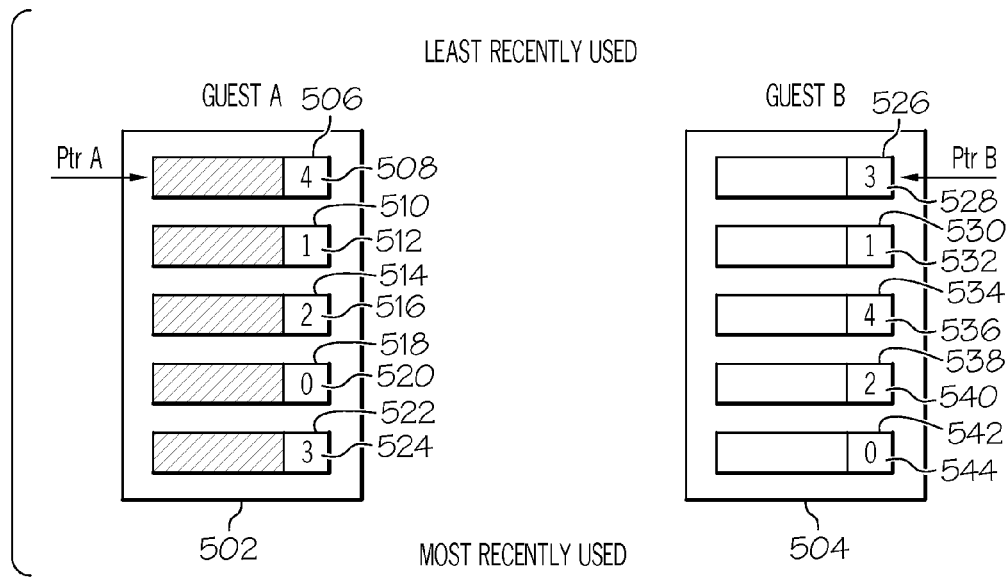
FIGS. 5-9 show the symmetric live migration of two virtual machines according to one embodiment of the present invention.

FIGS. 5-9 show an exemplary symmetric live migration of virtual machines in accordance with one embodiment of the present invention. FIG. 5 shows a logical map 502 for a virtual machine 112 on the first information processing system 102, and a logical map 504 for a virtual machine 122 on the second information processing system 104. While in the example of FIGS. 5-9 the virtual machines 112 and 122 have the same number of memory pages, if one of the virtual machines were smaller in terms of memory pages then the size of the smaller virtual machine would be padded in this embodiment to substantially match the size of the larger virtual machine.

As shown in FIG. 5, the virtual machine 112 has a first memory page 506 with embedded metadata 508 indicating the physical page offset of the memory page 506 on its original/source system 102. The virtual machine 112 also has a second memory page 510 with embedded metadata 512 indicating the physical page offset of the memory page 510 on its original/source system 102. A third memory page 514 has embedded metadata 516 indicating the physical page offset of the memory page 516 on its original/source system 102. A fourth memory page 518 has embedded metadata 520 indicating the physical page offset of the memory page 518 on its original/source system 102. The virtual machine 112 also has a fifth memory page 520 with embedded metadata 522 indicating the physical page offset of the memory page 520 on its original/source system 102.

The virtual machine 122 has a first memory page 526 with embedded metadata 528 indicating the physical page offset of the memory page 526 on its original/source system 104. The virtual machine 122 also has a second memory page 530 with embedded metadata 532 indicating the physical page offset of the memory page 520 on its original/source system 104. A third memory page 534 has embedded metadata 536 indicating the physical page offset of the memory page 534 on its original/source system 104. A fourth memory page 538 has embedded metadata 540 indicating the physical page offset of the memory page 538 on its original/source system 104. The virtual machine 122 also has a fifth memory page 542 with embedded metadata 544 indicating the physical page offset of the memory page 542 on its original/source system 104.

When the symmetric live migration process begins each migration manager 118 and 132 copies the paged out memory pages in its data storage 108 and 126 to the data storage of the other system. For example, the migration manager 118 at the first information processing system 102 copies its paging data sets to the data storage 126 of the second information processing system 104, and the migration manager 132 at the second information processing system 104 copies its paging data sets to the data storage 108 of the first information processing system 102. The memory pages 506, 510, 514, 518, and 522 of virtual machine A 112 and the memory pages 526, 530, 534, 538, and 542 of virtual machine B 122 are swapped symmetrically moving top down through the LRU maps 502 and 504 of the virtual machines 112 and 122.

Figure 6:
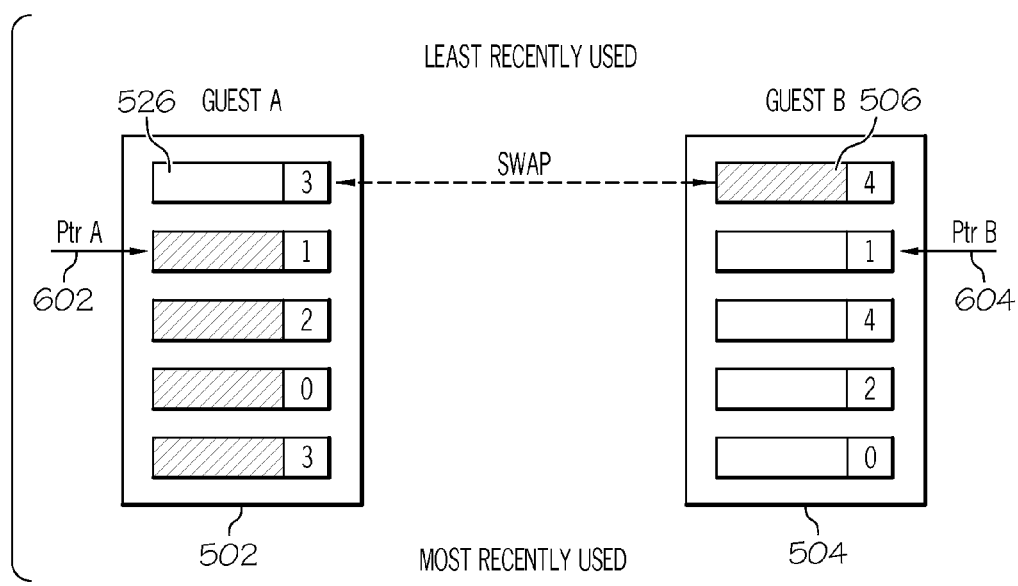

FIG. 6 shows that in this embodiment there first occurs a symmetric swap of the first memory pages 506 and 526 in the LRU maps 502 and 504 of the virtual machines 112 and 122. As shown, the first memory page 506 of virtual machine A 112 now resides in the same position of the virtual machine B LRU map 504 where the first memory page 526 of virtual machine B 122 resided. The first memory page 526 of virtual machine B 122 now resides in the same position of the virtual machine A LRU map 502 where the first memory page 506 of virtual machine A 112 resided. This symmetric swapping is tracked, in this embodiment, by advancing the LRU pointers 602 and 604 for the virtual machines in lockstep when a swap is completed. In this embodiment, additional space for these pointers 602 and 604 is allotted on each system, but this is not required. Alternatively, the additional space can be implemented as a hardware feature register.

Figure 7:
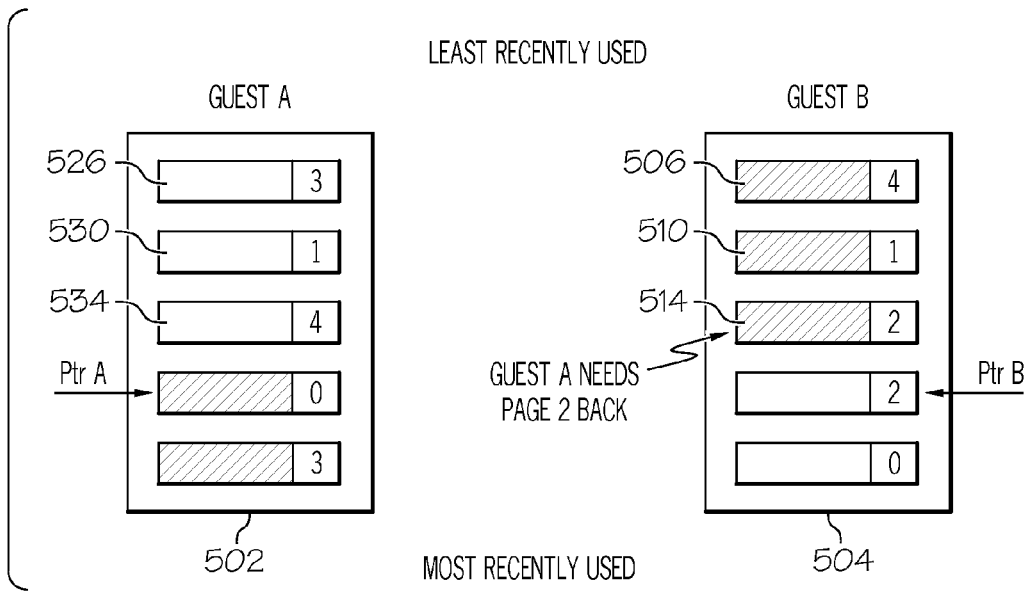

FIG. 7 shows that additional symmetric swap operations have been performed. As shown, the second memory page 510 of virtual machine A 122 now resides in the same position of the virtual machine B LRU map 504 where the second memory page 530 of virtual machine B 122 resided. The second memory page 530 of virtual machine B 122 now resides in the same position of the virtual machine A LRU map 502 where the second memory page 510 of virtual machine A 112 resided. Even further, the third memory page 514 of virtual machine A 122 now resides in the same position of the virtual machine B LRU map 504 where the third memory page 534 of virtual machine B 122 resided. The third memory page 534 of virtual machine B 122 now resides in the same position of the virtual machine A LRU map 502 where the third memory page 514 of virtual machine A 112 resided. This process continues until all of the memory pages have been symmetrically swapped.

Figure 8:
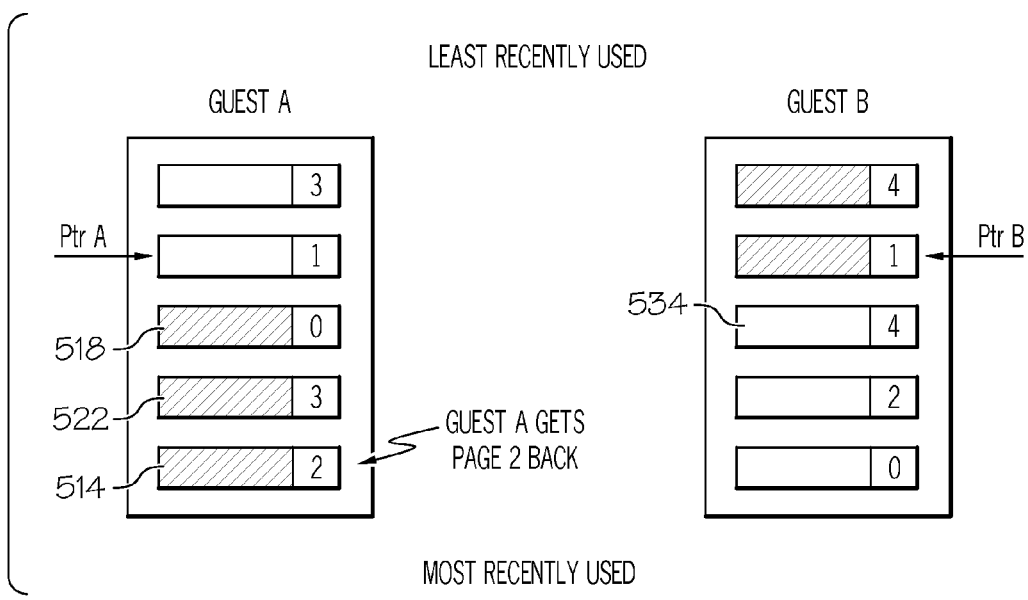

If at any point during the symmetric live migration process one of the virtual machines needs a page of its own that has already been swapped (i.e., the page has already been sent to the other system as indicated by the page residing logically above the pointer in the corresponding LRU map), then this virtual machine can demand this missing page from the other system. When this demand occurs, the requested page must be swapped back over to the original host. FIG. 8 shows an example in which virtual machine B needs its memory page 514 with offset "2" back from the second system 104. This reversed page cannot just be placed anywhere within the data storage 108 of the original host system 102 because this could cause the sorting at the end of the swap phase to be incorrect. Therefore, in this embodiment, the migration manager reverses a previous symmetric page swap by placing the requested page that is being reversed at the bottom of the LRU map on the requestor's side. The symmetrically aligned page that is being swapped back from the requestors to the original side is placed where the pointer had been advanced to. Swapping can continue as normal, because the symmetry of the LRU map has not been disrupted.

Additionally, mechanisms for slowing a guest and packing the register state can also be implemented. In some embodiments, one or more mechanisms is used to slow a guest when desired progress is not being made. For example, if a guest is running at full speed, it may reference 1000 pages during a certain time interval. It is likely that some of these 1000 pages had already been sent to the target system. If now the source system needs to get these pages back and send these pages out again at a later point in time when the guest is done with these pages, this dramatically slows down the migration process. If the guest is running more slowly, it may only reference 100 pages instead of 1000 in the same time interval, and the source system will not need to get as many pages back from the target system. One simple scheme to slow down the guess is to lower its priority (if the host system uses priority based CPU scheduling). With a lower priority the guest gets fewer CPU cycles and thus runs more slowly. After the majority of the pages have been transferred to the target system, the contents of the registers are transferred as well since the system state for this guest on the target system should be identical to the original state on the source system. The guest system is paused for the register state (and any remaining pages) transfer.

FIG. 8 shows that in this example the memory page 514 requested back by virtual machine A 112 is placed at the bottom of the LRU map 502 for virtual machine A 112. The memory page 534 of virtual machine B 122 that was symmetrically aligned with the reversed memory page 514 is also swapped back to its original system 104 at a position in the LRU map 504 where the pointer had been advanced to. Because the reversed memory page 514 is placed at the bottom of its original LRU map 502 and the corresponding symmetrically aligned memory page 534 has been swapped back to its original host system 104, the memory pages 518 and 522 at the location and below the location pointed to by the pointer 602 when the page reversal is requested are moved up one position in the LRU map 502, as shown in FIG. 8.

Figure 9:
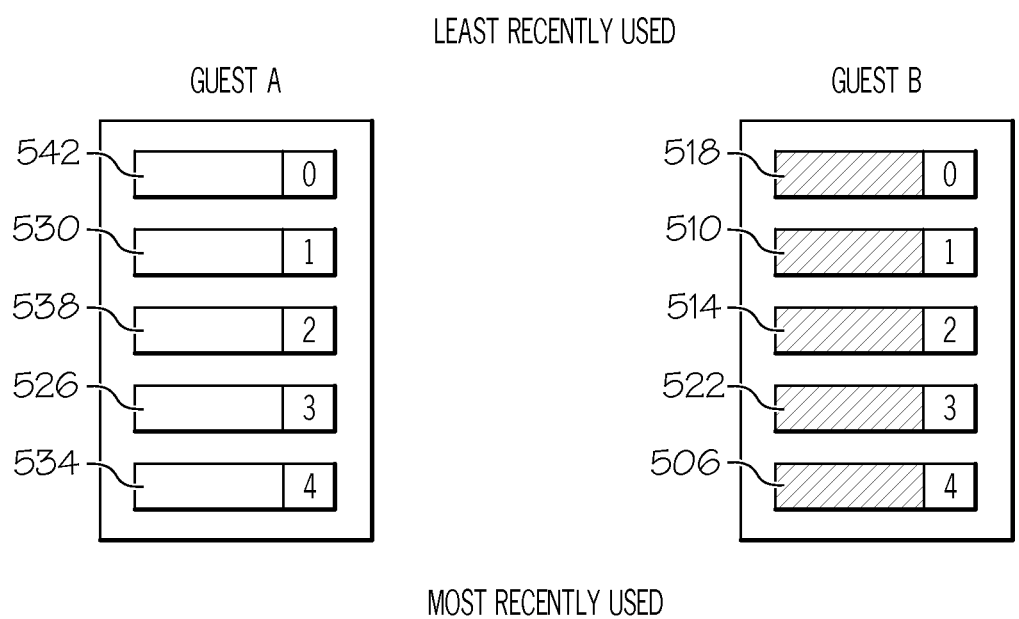

Once the symmetric live migration process is completed (i.e., all of the memory pages 506, 510, 514, 518, and 522 of virtual machine A 112 are migrated over to the second information processing system 104 and all of the memory pages 526, 530, 534, 538, and 542 of virtual machine B are migrated over to the first information processing system 102), the migration managers 118 and 132 sort the memory pages by their physical locations, which are embedded within the pages or included within a separate packet during the swapping process, before activating the guests on the system, as shown in FIG. 9. In other words, each migration manager 118 and 132 sorts the memory pages by their physical originator metadata and align the memory pages with those physical addresses.

Figure 10:
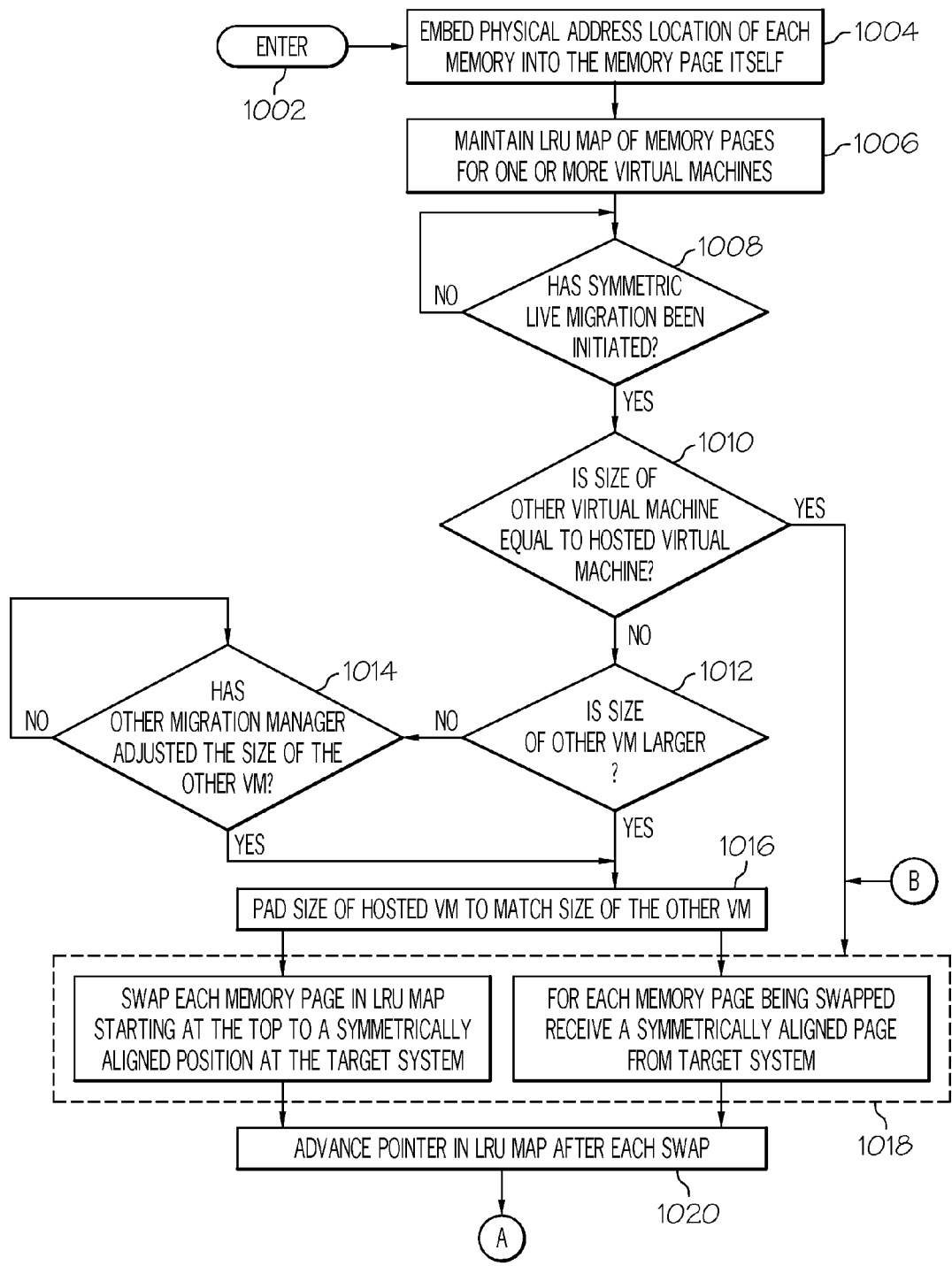
FIGS. 10 and 11 are operational flow diagrams illustrating a symmetric live migration process according to one embodiment of the present invention.
Figure 11:
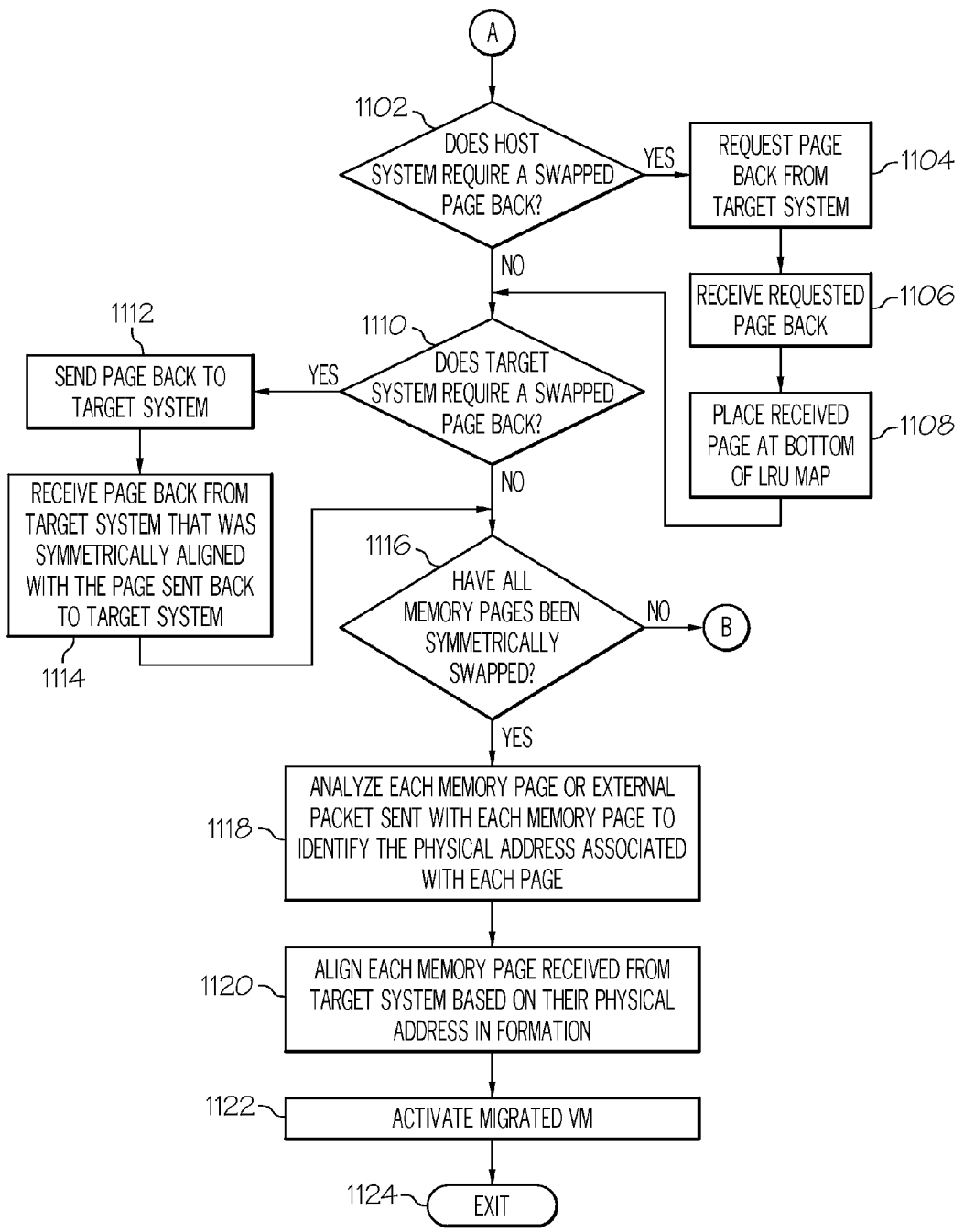

FIGS. 10 and 11 are operational flow diagrams illustrating a process for symmetrically migrating two or more virtual machines according to one embodiment of the present invention. The operational flows of FIGS. 10 and 11 can be performed on both information processing systems at the same time during the migration process. The operational flow of FIG. 10 beings at step 1002 and flows directly to step 1004. The migration manager, at step 1004, embeds physical address location information of each memory page into the memory pages themselves. Alternatively, the migration manager can store this information external to the memory pages and send a separate packet comprising this address information along with the memory pages during migration.

The migration manager, at step 1006, maintains an LRU map for the memory pages. The migration manager, at step 1008, determines if a symmetric live migration process has been initiated. If the result of this determination is negative, the migration manager again determines if a symmetric live migration process has been initiated. If the result of this determination is positive, the migration manager, at step 1010, determines if the size of the other virtual machine (i.e., the virtual machine that is to be migrated over to the system) is equal to the virtual machine hosted at the system.

If the result of this determination is positive, the control flows to step 1018. If the result of this determination is negative, the migration manager, at step 1012, determines if the size of the other virtual machine is larger than the hosted virtual machine. If the result of this determination is negative, the migration manager, at step 1014, determines if the other migration manager has adjusted the size of the other virtual machine. When the result of this determination is positive, the control flows to step 1016. If the result of the determination at step 1012 is positive, the migration manager at step 1016, pads the size of the hosted virtual machine so as to substantially match the size of the other virtual machine.

The migration manager, at step 1018, symmetrically swaps each memory page in the LRU map starting at the top of the map to a symmetrically aligned position on the other system. The migration manager also symmetrically receives a corresponding memory page from the other system and places this received memory page at the location of the memory page that has been symmetrically swapped out from the system. The migration manager, at step 1020, advances the LRU map pointer after the swap. The control then flows to step 1102 of FIG. 11.

The migration manager, at step 1102, determines if the host system requires a swapped page to be returned. If the result of this determination is positive, the migration manager, at step 1104, requests the page back from the target system. The migration manager, at step 1106, receives the requested page back and places the received page at the bottom of the LRU map. The control then flows to step 1110.

If the result of the determination at step 1102 is negative, the migration manager, at step 1110, determines if the target system requires a swapped page to be returned. If the result of this determination is positive, the migration manager, at step 1112, sends the required page back to the target system. The migration manager, at step 1114, receives a corresponding memory page back from the target system that was symmetrically aligned with the memory page sent back to the target system. The control then flows to step 1116.

If the result of the determination at step 1110 is negative, the migration manager, at step 1116, determines if all the memory pages have been symmetrically swapped. If the result of this determination is negative, the control flows to step 1018 of FIG. 10. If the result of this determination is positive (i.e., the virtual machines have been symmetrically swapped), the migration manager, at step 1118, analyzes each symmetrically swapped memory page or an external packet received with each memory page to identify the physical address associated with each memory page. The migration manager, at step 1120, aligns each of the memory pages received from the target system based on their physical address information. The migration manager, at step 1122, activates the migrated virtual machine. The control flow then exits at step 1124.

Figure 12:
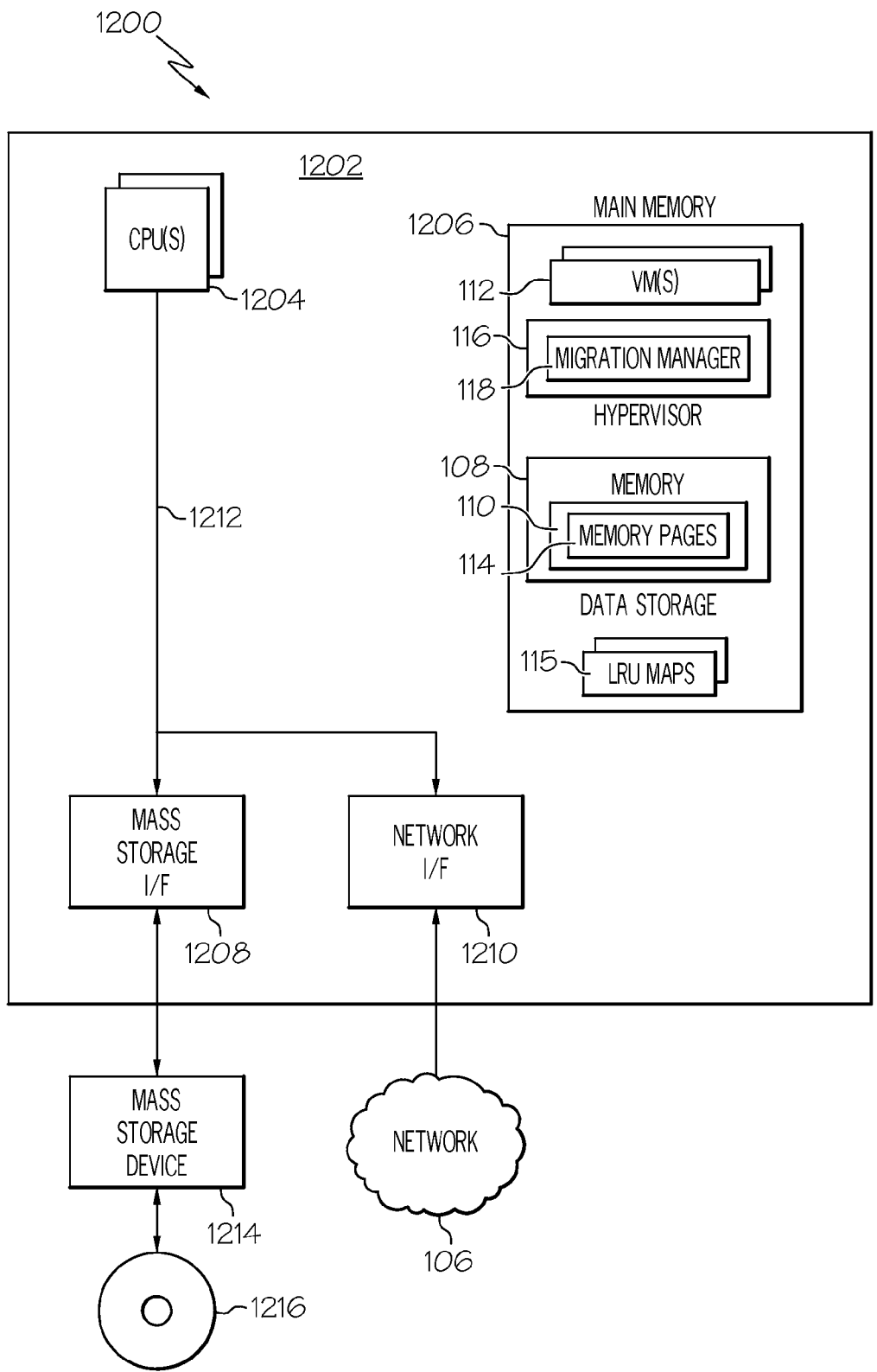
FIG. 12 is a block diagram illustrating an information processing system according to one embodiment of the present invention.

FIG. 12 is a block diagram illustrating an information processing system according to one embodiment of the present invention. For example, the information processing system 1200 can be any of the information processing systems of FIG. 1 and can include the components described above with respect to those systems. The information processing system 1200 is based upon a suitably configured processing system adapted to implement one or more embodiments of the present invention. Any suitably configured processing system is similarly able to be used as the information processing system 1200 by embodiments of the present invention.

The information processing system 1200 includes a computer 1202. The computer 1202 has a processor(s) 1204 that is connected to a main memory 1206, a mass storage interface 1208, and a network adapter hardware 1210. A system bus 1212 interconnects these system components. The mass storage interface 1208 is used to connect mass storage devices, such as data storage device 1214, to the information processing system 1200. One specific type of data storage device is an optical drive such as a CD/DVD drive, which may be used to store data to and read data from a computer readable medium or storage product such as (but not limited to) a CD or DVD 1216. Another type of data storage device is a data storage device configured to support, for example, NTFS type file system operations.

The main memory 1206, in this embodiment, comprises the virtual machines 112 and 122, the hypervisors 116 and 130, the migration managers 118 and 132, the data storage 108 and 126, the memory pages 114 and 128 (and migration data), and the LRU maps 115 and 129 (and migration packets). Although illustrated as concurrently resident in the main memory 1206, components of the main memory 1206 are not required to be completely resident in the main memory 1206 at all times or even at the same time. In this embodiment, the information processing system 1200 utilizes conventional virtual addressing mechanisms to allow programs to behave as if they have access to a large, single storage entity (referred to as a computer system memory), instead of access to multiple, smaller storage entities such as the main memory 1206 and data storage device 1216. The term "computer system memory" is used herein to generically refer to the entire virtual memory of the information processing system 1200.

Although only one CPU 1204 is illustrated for computer 1202, computer systems with multiple CPUs can be used equally effectively. Further embodiments of the present invention incorporate interfaces that each include separate, fully programmed microprocessors that are used to off-load processing from the CPU 404. An operating system included in the main memory is a suitable multitasking operating system such as the Linux, UNIX, Windows XP, or Windows Server operating system. Further embodiments of the present invention are able to use any other suitable operating system. Some embodiments of the present invention utilize architectures, such as an object oriented framework mechanism, that allow instructions of the components of operating system to be executed on any processor located within the information processing system 1200. The network adapter hardware 1210 is used to provide an interface to one or more networks 106. Further embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via CD, DVD, CD-ROM, other forms of recordable media, or other forms of computer readable storage media, for example, the computer readable medium or storage product 1216 of FIG. 12.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, one embodiment of the present invention may not include all of the features described above. Therefore, it is intended that the present invention not be limited to the particular embodiments disclosed, but that the invention include all embodiments falling within the scope of the appended claims.

What is claimed is:

1. A computer-implemented method for symmetric live migration of virtual machines, the computer-implemented method comprising:
   generating a first least recently used map for a set of memory pages of a first virtual machine, the first least recently used map including metadata for each of the memory pages of the first virtual machine, and the metadata comprising a physical address location for each of the memory pages of the first virtual machine;
   sending, from the first virtual machine to a second virtual machine while the first virtual machine is executing, a first of the memory pages of the first virtual machine and the metadata for the first memory page of the first virtual machine; and
   receiving, from the second virtual machine at the first virtual machine, a first memory page of the second virtual machine and metadata for the first memory page of the second virtual machine,
   wherein the memory pages of the first virtual machine are ordered from a first location of the first least recently used map to a last location of the first least recently used map based on how recently each of the memory pages of the first virtual machine has been used, with the memory page that has been least recently used being indicated by the first location of the first least recently used map, and the memory page that has been most recently used being indicated by the last location of the first least recently used map, and
   the first memory page of the first virtual machine is located at the first location of the first least recently used map, and the first memory page of the second virtual machine is located at a corresponding first location of a second least recently used map for the memory pages of the second virtual machine.

2. The computer-implemented method of claim 1, further comprising:
   repeating the sending and the receiving for each of the other memory pages of the first and second virtual machines based on the order of the memory pages in the least recently used maps of the first and second virtual machines.

3. The computer-implemented method of claim 2, further comprising:
   after all of the memory pages of the first virtual machine have been sent to the second virtual machine and all of the memory pages of the second virtual machine have been received at the first virtual machine, sorting the memory pages received from the second virtual machine based on the physical address locations in the metadata that was received with the memory pages of the second virtual machine.

4. The computer-implemented method of claim 3, further comprising:
   after the sorting, activating a virtual machine that utilizes each of the memory pages that was received from the second virtual machine.

5. The computer-implemented method of claim 1, further comprising:
   before the sending, if the set of memory pages of the first virtual machine is smaller than a set of the memory pages of the second virtual machine, logically increasing the size of the set of memory pages of the first virtual machine so as to substantially match the set of memory pages of the second virtual machine.

6. The computer-implemented method of claim 1, wherein the sending comprises embedding the metadata for the first memory page of the first virtual machine within the first memory page of the first virtual machine.

7. The computer-implemented method of claim 1, wherein the sending comprises:
   generating a packet that is separate from the first memory page of the first virtual machine, the packet including the metadata for the first memory page of the first virtual machine; and
   sending the packet from the first virtual machine to a second virtual machine.

8. The computer-implemented method of claim 1, further comprising:
   after the sending, requesting the first memory page of the first virtual machine from the second virtual machine;
   receiving the first memory page of the first virtual machine from the second virtual machine; and
   placing the first memory page of the first virtual machine at a last location of the first least recently used map.

9. The computer-implemented method of claim 1, further comprising:
   after the receiving, receiving a request from the second virtual machine for the first memory page of the second virtual machine;
   sending the first memory page of the second virtual machine to the second virtual machine; and
   receiving, from the second virtual machine, the memory page of the first virtual machine that was located at the corresponding location of the second least recently used map of the second virtual machine.

* * * * *